United States Patent
Huang (10) Patent No.: US 7,990,956 B2
(45) Date of Patent: Aug. 2, 2011

(54) VOICE COMMUNICATION SYSTEM OVER IP PHONE SYSTEM

(76) Inventor: Shyh-Luh Huang, Taipei (TW)

(*) Notice: Subject to any disclaimer, the term of this patent is extended or adjusted under 35 U.S.C. 154(b) by 1315 days.

(21) Appl. No.: 11/586,661

(22) Filed: Oct. 26, 2006

(65) Prior Publication Data

US 2008/0101341 A1 May 1, 2008

(51) Int. Cl.
- H04L 12/66 (2006.01)
- H04L 12/28 (2006.01)
- H04L 12/56 (2006.01)
- H04J 3/16 (2006.01)
- H04J 3/22 (2006.01)
- H04J 1/02 (2006.01)

(52) U.S. Cl. ..... 370/353; 370/354; 370/355; 370/395.2; 370/395.54; 370/401; 370/422; 370/466; 370/467; 370/493

(58) Field of Classification Search .............. None
See application file for complete search history.

(56) References Cited

U.S. PATENT DOCUMENTS

| | | | | |
|---|---|---|---|---|
| 7,474,741 B2* | 1/2009 | Brunson et al. | ............ | 379/88.17 |
| 7,688,958 B2* | 3/2010 | Dolan et al. | ............. | 379/142.02 |
| 2003/0002637 A1* | 1/2003 | Miyauchi et al. | .......... | 379/93.01 |
| 2007/0121879 A1* | 5/2007 | McGary et al. | .......... | 379/218.01 |
| 2008/0025259 A1* | 1/2008 | Ponnuswamy et al. | ....... | 370/331 |
| 2008/0089509 A1* | 4/2008 | Wuthnow et al. | ........ | 379/374.03 |
| 2008/0125077 A1* | 5/2008 | Velazquez et al. | ......... | 455/404.2 |
| 2010/0189099 A1* | 7/2010 | Bae et al. | ...................... | 370/352 |

OTHER PUBLICATIONS

Session Initiation Protocol (SIP) Public Switched Telephone Network (PSTN) Call Flows, RFC 3666, by Johnston et al. Published Dec. 2003.*

* cited by examiner

*Primary Examiner* — Daniel J Ryman
*Assistant Examiner* — Nishant B Divecha
(74) *Attorney, Agent, or Firm* — Birch, Stewart, Kolasch & Birch, LLP (57) ABSTRACT

A voice communication system configured over an IP phone system, with which users could establish voice calls between analog telephone devices and IP phones through an IP phone system without changing their conventional usage method is provided. To allow analog telephone devices to be able to login to the IP phone system, the communication mediation device is required to replace an analog telephone device by be an IP phone user in the IP phone system, and to process voice communications by using analog-digital signal conversion. Using the pre-established registration information, thus allowing the IP phone upon only determining the destination telephone number, it is then capable of automatic converting the telephone number to the corresponding IP phone account so as to proceed with a call through the IP phone system.

12 Claims, 9 Drawing Sheets

VOICE COMMUNICATION SYSTEM OVER IP PHONE SYSTEM

BACKGROUND OF THE INVENTION

1. Field of the Invention

The present invention relates generally to a voice communication system, and in particular to a voice communication system configured over an IP phone system.

2. The Prior Arts

Currently, with the development of real-time communication systems such as Microsoft® Instant Messenger, GOOGLE™ TALK, QQ™, MSN®, or ICQ® or similar software, in addition to real-time text communication, voice communication software is also developed, and especially Skype™, which utilizing P2P, is one of the fastest developing among these software.

Although these IP phones have the advantages of being toll free and having improving communication quality, but their user groups are only focused on internet users. To those who only know how to use traditional telephones, it remains difficult for them to use the IP phone. Consequently, the development of the IP phone has entered into a new arena, where those that are not proficient at using computers and Internet are to be enabled to make better use of the benefits brought together by the IP phone.

Conventionally, most of the integrations of the traditional telephone and the IP phone are still not separated from the computer and the operation of computers. In other words, they are merely connecting the telephone with the computer through a USB interface, where the answering and dialing of the telephone remains to be operated through the computer. Another kind of IP phone, although could be used as a typical telephone, it can only be used to communicate with another IP phone, and cannot be integrated into all other Internet phone systems, such as, for example, the calling of Skype™ users.

To enable the IP phone and the traditional analog telephone to communicate with each other, the "SkypeOut" function has been developed under the Skype™ system, which allows the IP phone to communicate with destination analog telephones through the existing analog telephone systems. However, this exchange method has to be cooperated with the local network provider, and the voice communication also must be transferred to analog telephone devices through the telecommunication equipment and the lines of local telecommunication providers, thus specific necessary fees are being collected for the local network provider, and the corresponding expenses should naturally be distributed among the users. Irrespective of whether the SkypeOut function is to charge a fee or not, it is still impossible for one using the traditional analog telephone device to call a Skype™ user using an IP phone.

Since traditional analog telephone only provides numeric keys, in which the IP phone account with the English or Chinese characters could not be entered into the IP phone; therefore, this problem must be solved first so that it is possible for the traditional analog telephone to communicate with the IP phone.

To completely bypass the usage of the traditional local analog telephone network, and to also enable the IP phone and the analog telephone to communicate with each other, it has been described. In this prior art which mainly utilizes conversion between the telephone number and the IP phone dialing code, thus not only overcoming the problem of telephones only being capable of providing numerical keys, but also complete voice communication is achieved through the IP phone or IP telephony system.

However, in the aforementioned reference patent, the conversion table of telephone number and IP phone dialing code is respectively saved at the local end (i.e. placed along with the telephone device located in a particular office or home), so that the corresponding data could not be shared properly. Moreover, in a case where the analog telephone device is an extension telephone that is connected to a Private Automatic Branch Exchange (PABX), the aforementioned prior art could also not be used.

Generally, even when enterprises were to apply for as much as ten telephone lines, they would only publish one telephone number as public representation. So if using an IP phone conversion box utilizing the technology of the above-mentioned prior art, while it is possible to establish a call after the extension number is pressed (in actuality, it is likely that the establishing of a initial connection could be deemed difficult), but if the ten lines were to be busy at the same time, the lacking of appropriate process handling mechanism of the technology described in the prior art could easily lead to the paralysis of the whole system.

SUMMARY OF THE INVENTION

A primary objective of the present invention is to provide a voice communication system configured over an IP phone/telephony system, by means of centralized management of the conversions between telephone number and IP phone account, and analog/digital signal conversions. Once the IP phone has gathered the destination telephone number, it is then capable of automatically converting the telephone number to a corresponding IP phone account so as to proceed with a call through the IP phone system.

According to the above-mentioned objective, under the voice communication system configured over the IP phone system in accordance with the present invention, users could establish calls between the analog telephone devices and the IP phones through the IP phone system without having to change their conventional usage method. For allowing login at the analog telephone device into the IP phone system, the communication mediation device of the present invention is required to replace an analog telephone device by an IP phone user within the IP phone system, and permitting voice communications using analog-digital signal conversion. Using the pre-established registration information, once the IP phone has determined the destination telephone number, it is then capable of automatically converting the telephone number to the corresponding IP phone account so as to proceed with a call through the IP phone/telephony system.

BRIEF DESCRIPTION OF THE DRAWINGS

The present invention will be apparent to those skilled in the art by reading the following detailed description of a plurality of preferred embodiments thereof, with reference to the attached drawings, in which.

DETAILED DESCRIPTION OF THE PREFERRED EMBODIMENT

Figure 1:
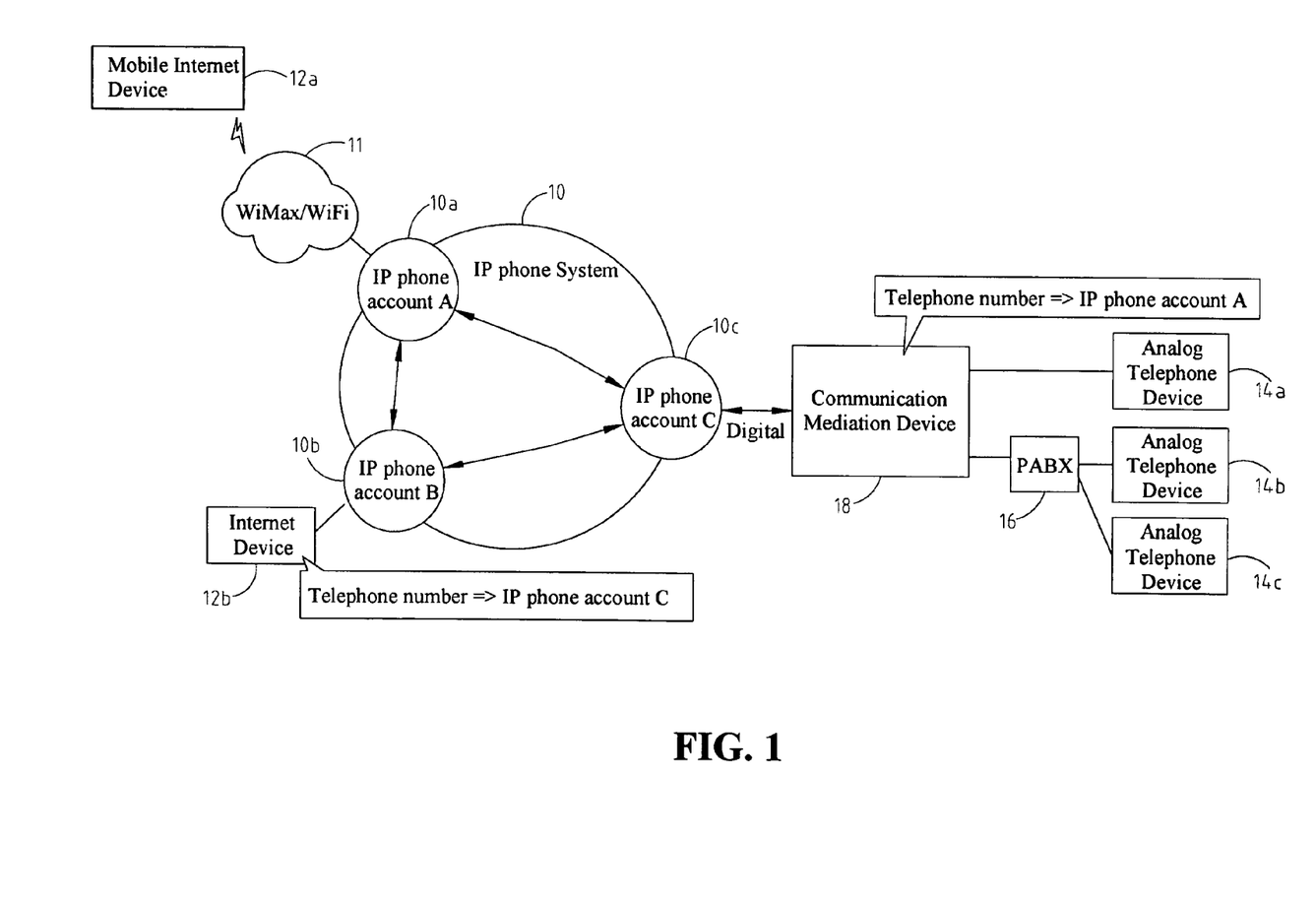
FIG. 1 is a schematic diagram showing a voice communication system configured over an IP phone system of the present invention.

With reference to FIG. 1, FIG. 1 is a schematic diagram of a voice communication system configured over an IP phone system, according to the present invention. As shown in FIG. 1, the voice communication system configured over the IP phone system mainly utilizing an existing IP phone system 10 (such as Skype™) or a self-developed/proprietary method for transferring data and voice, irregardless of a method 11 of which the IP phone device (i.e. a mobile internet device 12*a*, an internet device 12*b* at a client end) is login (whether through wired or Wimax/Wifi wireless), or through a plurality of analog telephone devices 14*a*~14*c* after login through a communication mediation device 18, they are all required to respectively first register in the IP phone system 10 and to obtain a plurality of IP phone accounts, A10*a*, B10*b* and C10*c*, and completing the procedure of login to the IP phone system 10 prior to the proceeding with of the voice communication between each other.

The mobile Internet device 12*a* and the Internet device 12*b*, executing the client program of the IP phone system 10, are able to receive calls or voice communications belonging to their accounts. Stated differently, the mobile Internet device 12*b* is able to call the IP phone account A10*a* through the IP phone account B10*b* of the IP phone system 10.

In regards to the analog telephone device 14*a*, it has an independent IP phone account. The analog telephone devices 14*b*~14*c* all belong to the extension telephones which are connected to a Private Automatic Branch exchange (PABX) 16, and have extension numbers. So the account corresponding to the main switchboard number of the PABX 16 is shared, but the PABX 16 still has a plurality of communication lines as found for typical PBXs providing for the analog telephone devices 14*b*~14*c* to use.

The above-mentioned communication mediation device 18 can be a server-class computer in fact, so that it can execute the client program of the IP phone system 10, thereby as to login to the IP phone system 10 as shown in FIG. 1. But for achieving the objective of the present invention, the client program must be encapsulated, and the voice and other original audio feed from the loudspeaker are converted to be transferred to the module of the communication mediation device 18 of the present invention.

Figure 8:
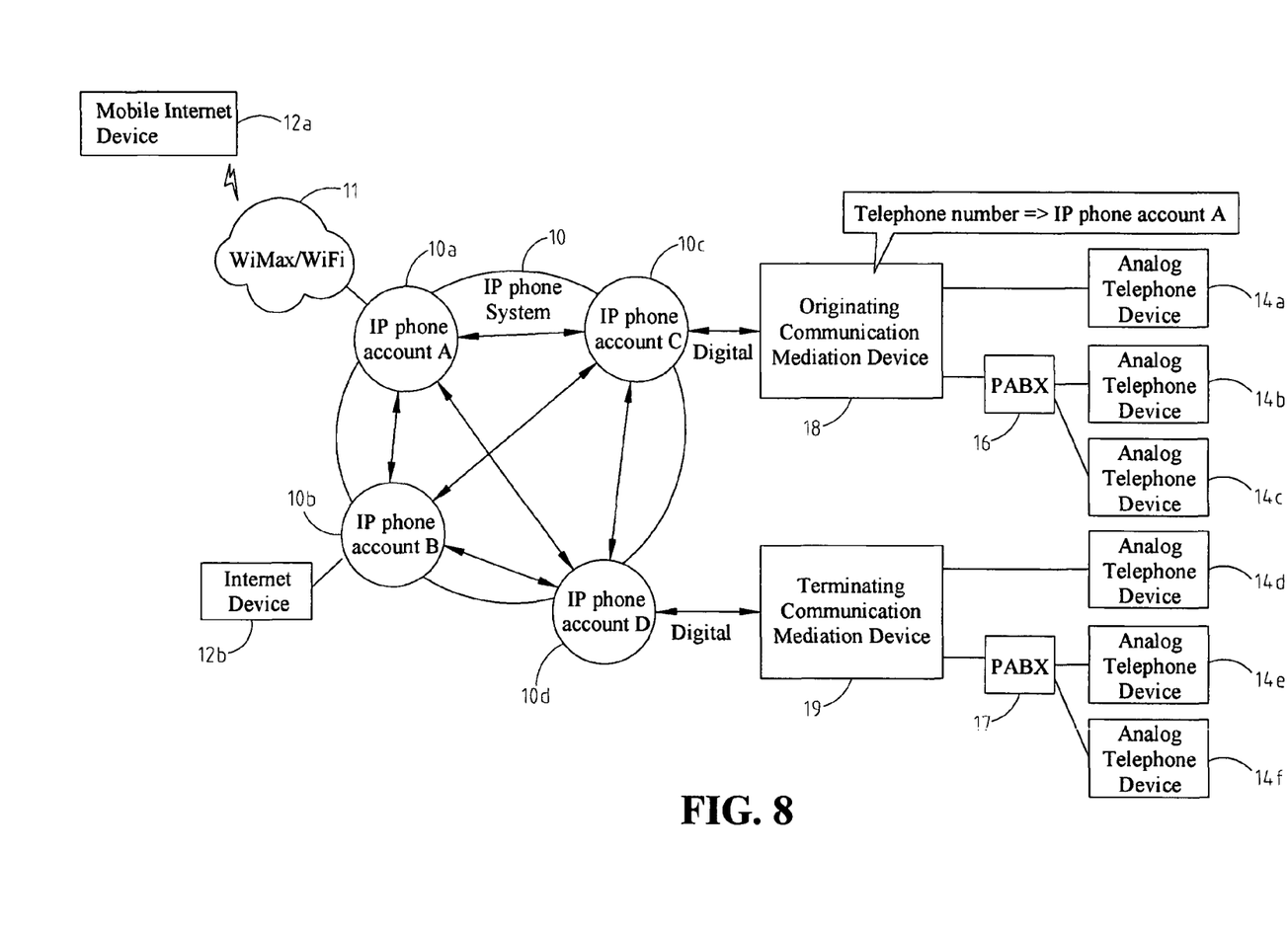
FIG. 8 is a schematic diagram showing the voice communication system configured over the IP phone system, in accordance with a fourth embodiment of the present invention.

There are three different communication modes according to the voice communication system configured over the IP phone system of the present invention: i.e. the analog telephone device 14*b* or 14*a* calling an IP phone device of an internet device 12*a*; the IP phone device of the internet device 12*a* calling an analog telephone device 14*b* or 14*a* and the analog telephone device 14*a* calling an analog telephone device 14*d* through the IP phone system 10 as shown in FIG. 8, thereby the embodiments of the three aforementioned communication modes are respectively described below.

Figure 2:
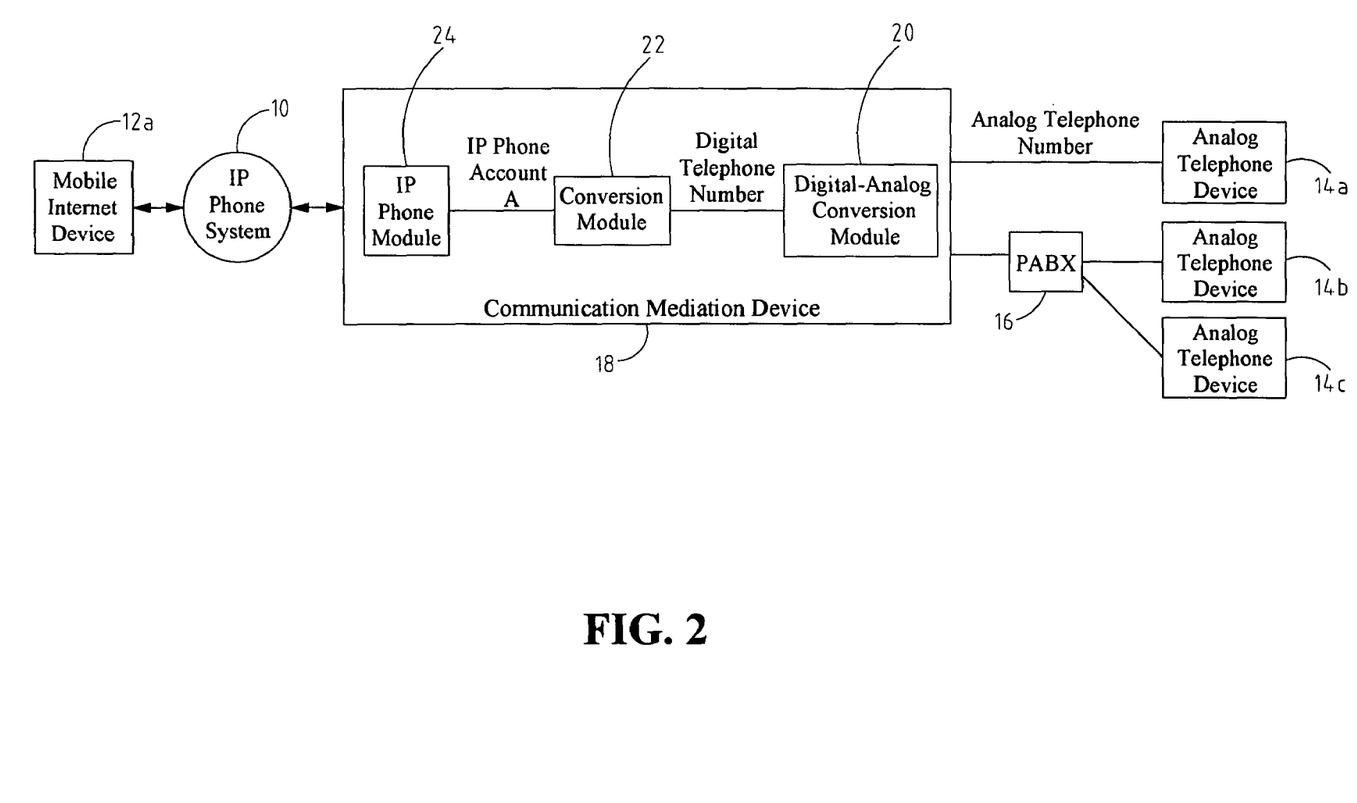
FIG. 2 is a schematic diagram showing a voice communication system configured over an IP phone system, in accordance with a first embodiment of the present invention.

With reference to FIG. 2, the FIG. 2 is a schematic diagram showing a voice communication system configured over an IP phone system, according to a first embodiment of the present invention. As shown in FIG. 2, the communication mediation device 18 of the voice communication system configured over the IP phone system, which mainly comprises of an analog/digital signal conversion module 20, a conversion module 22, and an IP phone module 24, is electrically connected to the analog telephone device 14*a*, and indirectly connected to the analog telephone devices 14*b* and 14*c*. Wherein, the IP phone module 24 is the client program of the above-mentioned IP phone system 10.

Figure 3A:
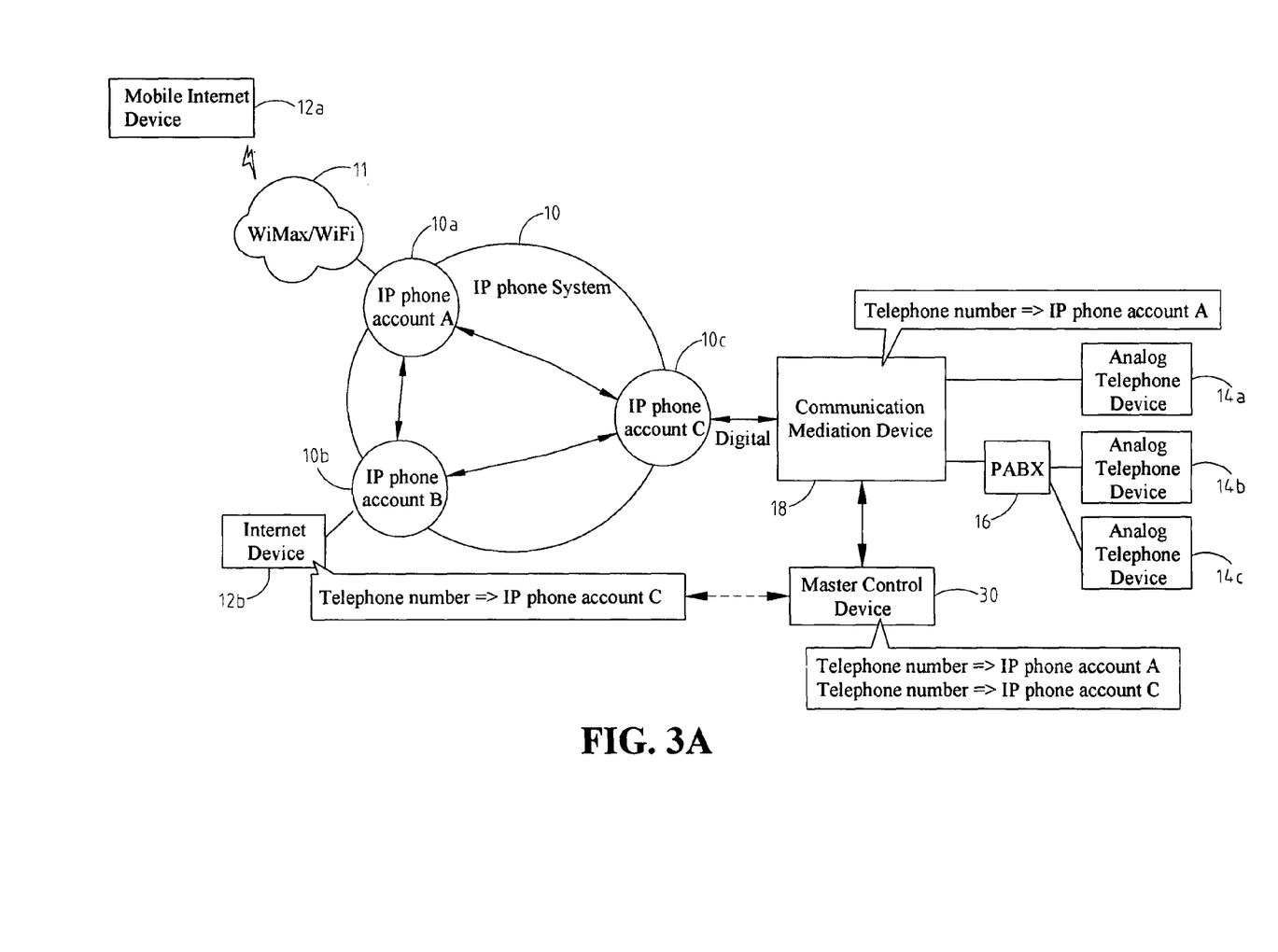
FIGS. 3A~3B are a plurality of schematic diagrams showing the voice communication system configured over the IP phone system, in accordance with a second embodiment of the present invention.

As shown in FIG. 2, as the analog telephone device 14*a* is trying to call the IP phone device of the internet device 12*a*, since a user has already determined the virtual telephone number of the internet device 12, therefore, the user can directly dial this virtual telephone number using the numeric keys of the telephone device, which is same as the method for dialing up traditional telephones. When the analog/digital signal conversion module 20 received this virtual telephone number, it will convert the telephone number dialed by the analog telephone device 14*a* to a digital signal. Then, the conversion module 22 will convert this telephone number in digital signal into the corresponding IP phone account A according to the data from an external master control device 30 (as shown in FIG. 3) or the built-in storage unit. Finally, the IP phone module 24 is utilized to call the IP phone device (i.e. the internet device 12*a*) with the corresponding IP phone account through the IP phone system 10, thereby enabling the analog telephone device 14*a* and the IP phone device (i.e. the internet device 12*a*) to conduct voice communication. Upon receiving of any responses or voice tones from the IP phone system 10, the analog/digital signal conversion module 20 will convert them to analog signals which are then transferred to the analog telephone device 14*b*.

Figure 3B:
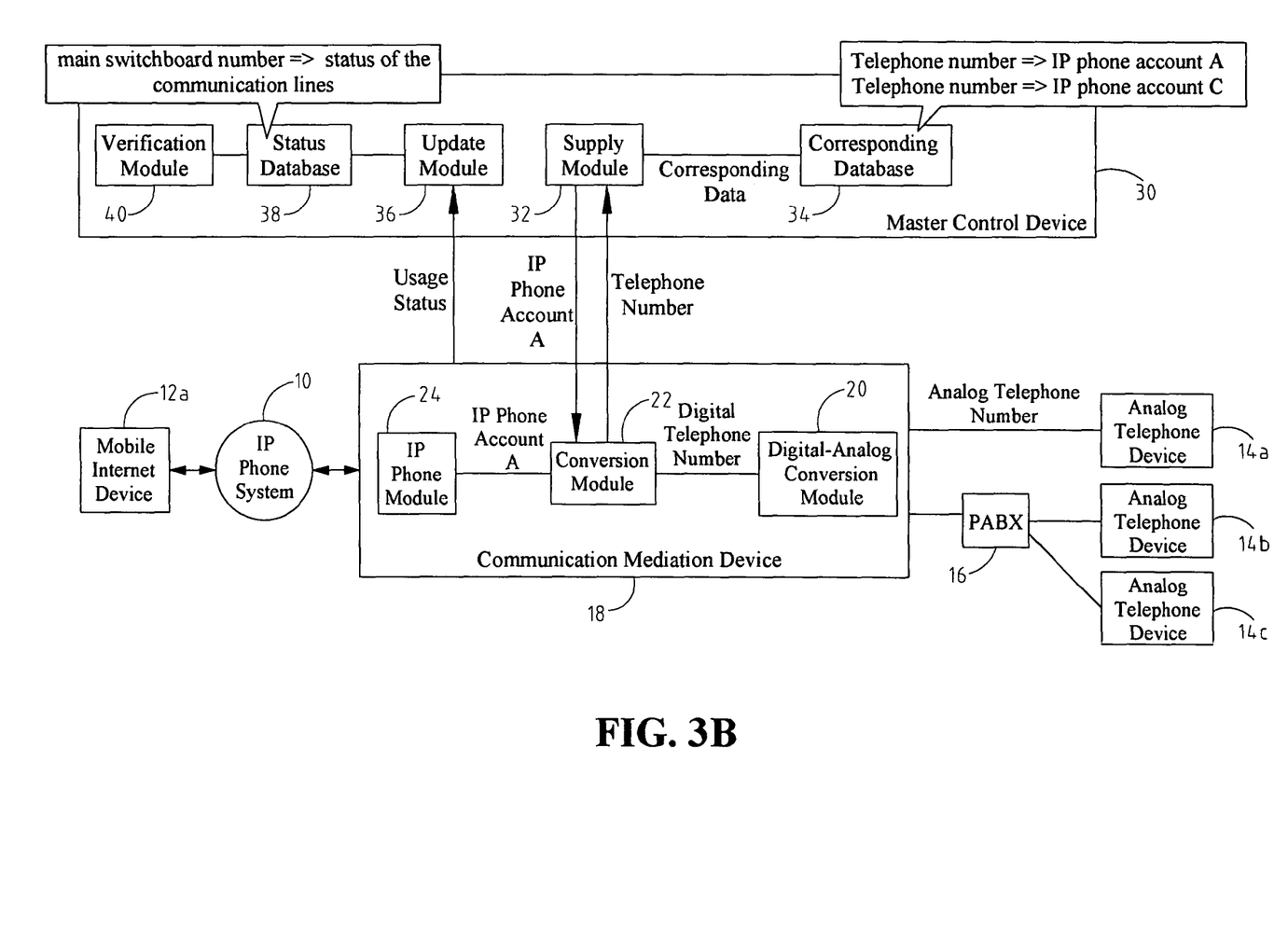

With reference to FIGS. 3A~3B, FIGS. 3A~3B are schematic diagrams showing a voice communication system configured over an IP phone system, according to a second embodiment of the present invention. As shown in FIG. 3A, the voice communication system configured over the IP phone system, comprises of the IP phone system 10, the internet device 12*a*, the internet device 12*b*, the communication mediation device 18, the analog telephone devices 14*a*~14*c*, the IP phone device A10*a*, the IP phone device B10*b*, the IP phone device C10*c*, the PABX 16, and additionally, the master control device 30.

In the voice communication system configured over the IP phone system of the present invention, the master control device 30 mainly manages during whether the communication lines between the PABX 16 and the communication mediation device 18 are busy or having idle lines available, and are capable of centralized management of the corresponding data of the IP phone accounts corresponding to all the telephone numbers or the main switchboard numbers of the PABX 16.

As shown in FIG. 3B, the master control device 30 in the voice communication system configured over the IP phone system of the present invention mainly comprises of a status database 38, an update module 36, a corresponding database 34, a supply module 32, and a verification module 40. However, the master control device 30 may only provide the function for supplying the corresponding data, so it may only comprises of the corresponding database 34 and the supply module 32. If the master control device 30 only provides the supply statuses of the communication lines, it may then only comprise of the status database 38 and the update module 36.

When the master control device 30 is centrally managing the corresponding data of the IP phone account corresponding to all telephone numbers or the main switchboard number, the supply module of the master control device 30 which will find out the corresponding IP phone account from the corresponding database 34 according to the telephone number from the conversion module 22. The corresponding data stored in the corresponding database 34 has where each corresponding data using telephone number to correspond to the IP phone account.

What requires special attention is that, after the conversion module 22 has obtained the corresponding IP phone account from the supply module 32 according to the telephone number, it can then store the corresponding relationship between the telephone number and the IP phone account into the storage media of communication mediation device 18, so as to allow the conversion module 22 to be able to directly convert the telephone number into the corresponding IP phone account. In this way, not only the above-mentioned conversion process can be completed in shorter time, but also further is capable of completing dialing request according to the older corresponding data in case that the corresponding data could not be successfully obtained from the master control device 30.

When determining whether the communication lines between the PABX 16 and the communication mediation device 18 are all busy or have idle lines available, it is required to collect the usage status of these communication lines first. In order to collect the usage status, the update module 36 will update the usage status of the communication lines corresponding with the main switchboard number according to the notification message from the communication mediation device 18. To the status data stored in the status database 38, each of them uses the main switchboard number to correspond with their usage status, and the usage status may mainly be identified as busy or idle.

The above-mentioned notification messages from the communication mediation device 18 can be dialing up or hanging up notification messages of the analog telephone devices 14a~14c from the analog/digital signal conversion module 20 and/or the IP phone module 24 (similar as conventional telephone, where both sides of a call may hang up the phone first, so that the hanging up notification message may come from either of both sides), or when the conversion module 22 is querying the corresponding IP phone account, according to the telephone number.

As a result, when the usage status of the communication lines are indicating busy, if some of the analog telephone devices 14a~14c required to be dialed up, the master control device 30 will reply to the communication mediation device 18 that the calling line of the analog telephone device 14a~14c is busy so that the dial up service could not be provided temporarily; however, it will not exhibit line blockage or gridlock at this step as are found in conventional systems. When some of the users hang up the phone, the usage status of at least one of the communication lines will be made to change to idle, and the master control device 30 will reply to the communication mediation device 18 that the calling line of the analog telephone device 14a~14c is idle, and also to reply to the corresponding IP phone account simultaneously, thereby the communication mediation device 18 is capable of establishing the call for the analog telephone devices 14a~14c.

Before the supply module 32 determines the corresponding IP phone account according to the telephone number or the main switchboard number, it is required to verify whether the number is a telephone number or a main switchboard number (if a main switchboard number is used, the company name and information will be provided) according to the corresponding data of the corresponding database 34. If the number is a telephone number belonging to the analog telephone device 14a, the supply module 32 can directly reply to the corresponding IP phone account. If the number is an extension telephone as from the analog telephone device 14b, the supply module 32 could not directly reply to the corresponding IP phone account since the verification of idle line is required before that; therefore, it is required so as to verify if there are any idle lines first.

Moreover, since there may be a large number of communication mediation devices 18, the transmission interface (not shown) may be extended to the master control device 30 and the communication mediation device 18, so as to improve the processing capability between the master control device 30 and the communication mediation device 18. Wherein, the multitask processing method should be the preferred method used between the transmission interface and the communication mediation device 18.

To ensure proper operation of system and the avoidance of potential accidents to the precious communication lines (located between the PABX 16 and the communication mediation device 18) being occupied by unexpected reasons (such as system failure or the inability to receive the verification packet that was previously sent), the verification module 40 of the master control device 30 can find out which of the communication lines that has expired predetermined time is still in busy status based upon the usage status of the communication lines in the status database 38, and verify whether these lines are in proper operation.

In addition to providing for the above-mentioned function, the master control device 30 also can provide the information and process mode related to overflowing.

Figure 4:
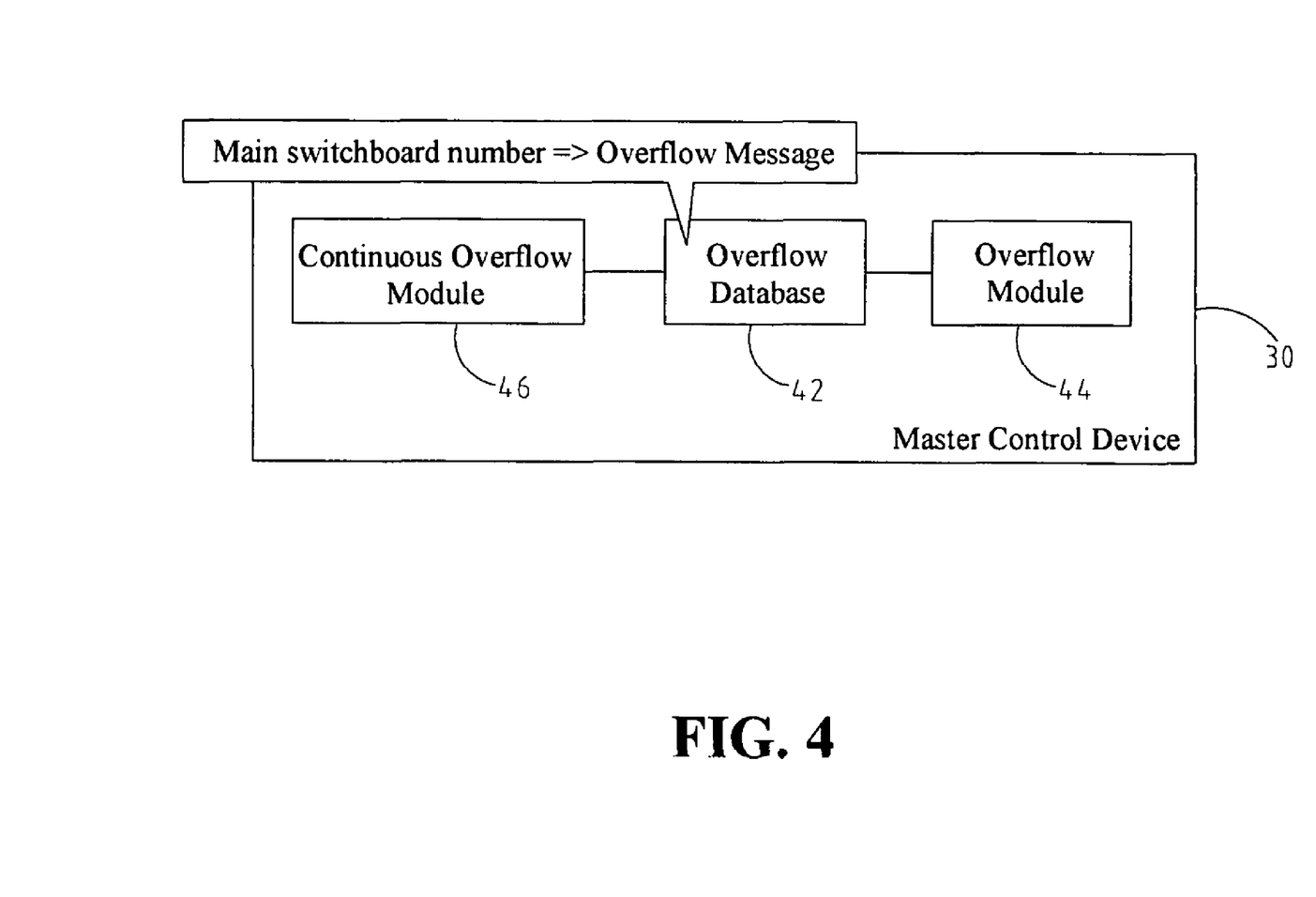
FIG. 4 is a schematic diagram showing a master control unit of the present invention.

With reference to FIG. 4, the FIG. 4 is a schematic diagram showing the master control device of the present invention. As shown in FIG. 4, the master control device of the present invention further comprises an overflow module 44, an overflow database 42, and a continuous overflow module 46.

The overflow module 44 can query for the status of the communication lines corresponding to the main switch board number based on the status data in the status database 34 as shown in FIG. 3B. If their statuses are all busy, then the overflow notification message corresponding to the main switchboard number is then updated in the overflow database 42. Each one of the overflow records stored in the overflow database 42 uses the main switchboard number to correspond with the overflow notification message. The continuous overflow module 46 is to query the overflow notification message corresponding to the main switchboard number based on these overflow records in the overflow database 42. If the overflow notification messages are often found at a predetermined frequency, then a continuous overflow message is to be sent out.

Consequently, the system operator can properly add communication lines between the PABX 16 and the communication mediation device 18 according to the continuous overflow message, which is by increasing the number of the IP phone program of the communication mediation device 18, and increasing the number of lines between the communication mediation device 18 and the PABX 16.

Figure 5:
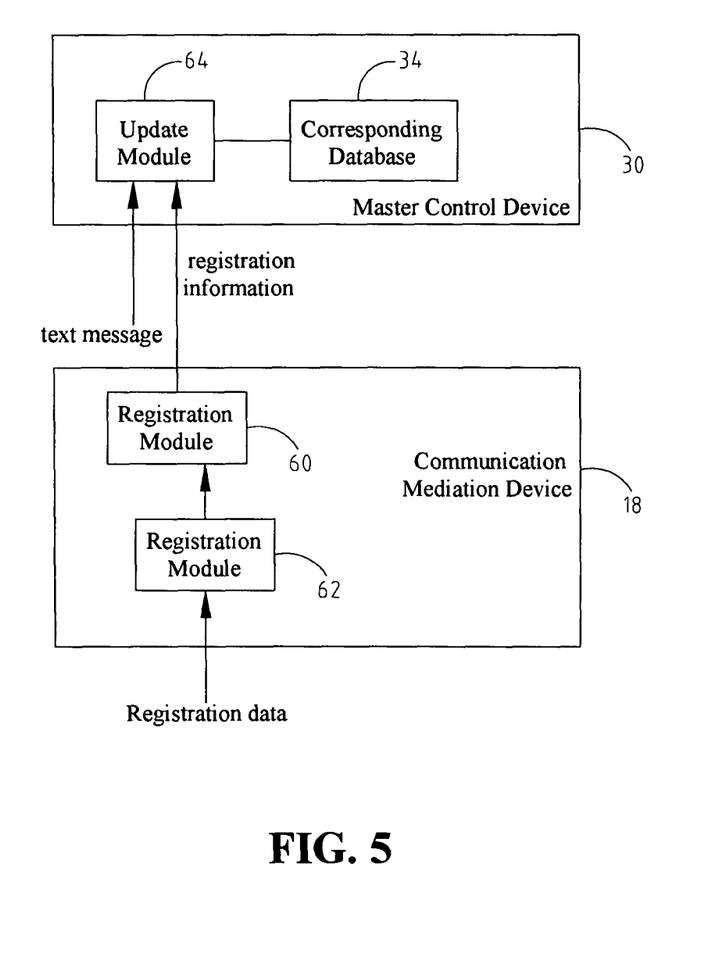
FIG. 5 is a schematic diagram showing a registration program of the present invention.

With reference to FIG. 5, FIG. 5 is a schematic diagram showing the registration program of the present invention. As shown in FIG. 5, the communication mediation device 18 further comprises a registration module 60, while the master control device 30 further comprises an update module 64 in order to add, delete, and modify the corresponding data in the corresponding database 34 (as shown in FIG. 5).

When the IP phone module 24 is installed into the communication mediation device 18, the registration procedure can be executed simultaneously. Before or after the finish of the installation of the IP phone module 24, a system user may fill in the registration information (to at least include one of the telephone number and the main switchboard number, and the corresponding IP phone account, or the company name) using the registration interface 62. Then the user is to complete the information and then send it. Thereafter, the registration module 60 may receive this registration information and transfer it to the update module 64 of the master control device 30. Thereafter the update module 64 may update the corresponding data in the corresponding database 34.

The user can also use mobile phones for completing the above-mentioned registration procedure, i.e. sending out text messages including the IP phone account (the preferred option is to do pre-registration) to the master control device 30, and then the master control device 30 can receive the IP phone account and the telephone number by receiving the text message with the IP phone account and regarding the caller ID in the text message as the telephone number.

In this way, based on the system configuration of the present invention as described above, when a user of the internet device 12b is to call the above-mentioned mobile phone, he can use the IP phone account of the text message to call the mobile phone through the IP phone system.

Figure 6:
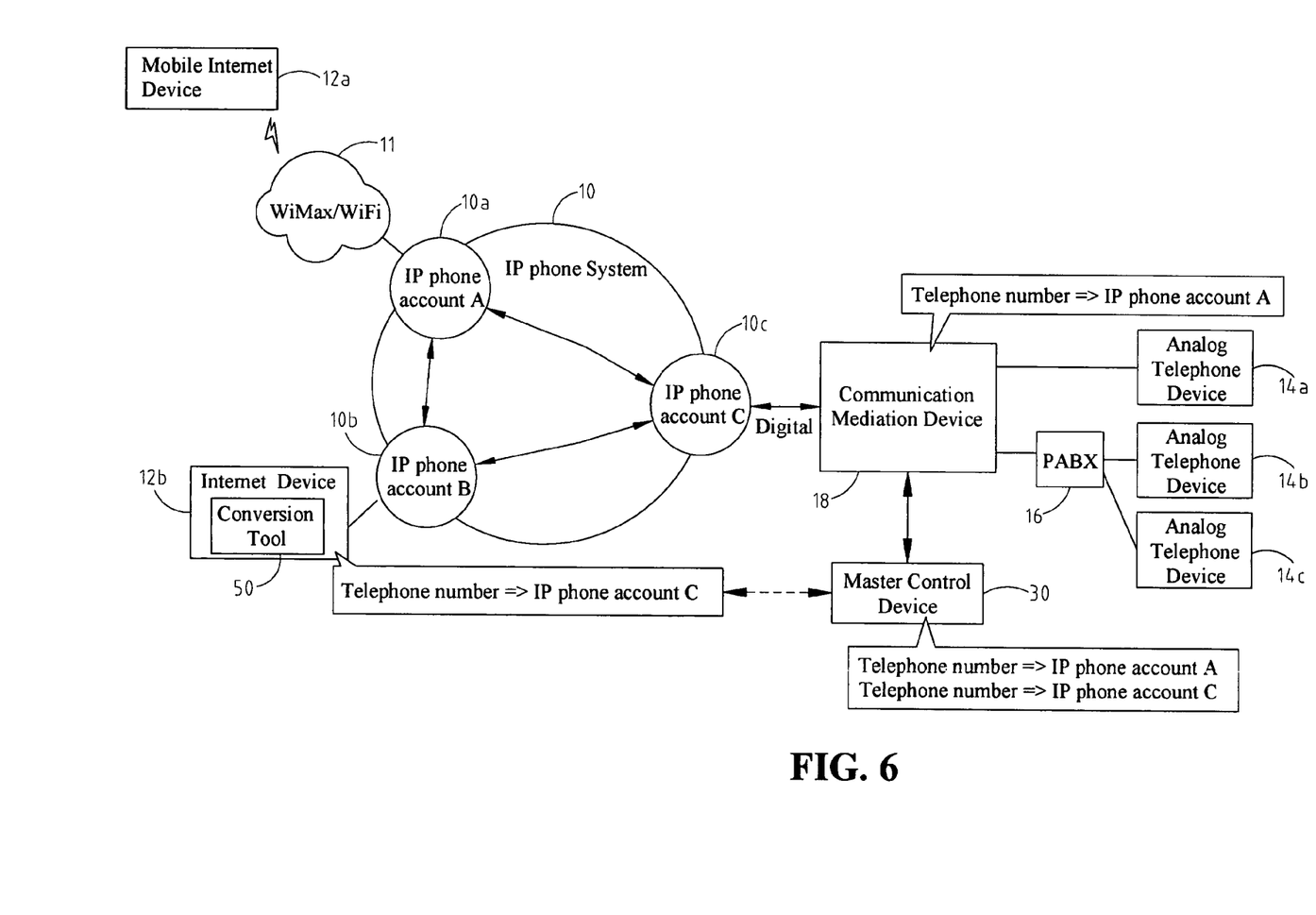
FIG. 6 is a schematic diagram showing a conversion tool of the present invention.

With reference to FIG. 6, FIG. 6 is a schematic diagram showing the conversion tool of the present invention. As shown in FIG. 6, if the conversion tool 50 is installed in the internet device 12b or the mobile internet device 12a (i.e. computer or wireless PDA), the conversion tool 50 only requires to know the main switchboard number of the PABX before it proceeds to the above-mentioned dialing process, and then could automatically use the main switch board number or telephone number to obtain the corresponding IP phone account from the supply module 32 of the master control device 30 according to the corresponding data stored in the corresponding database 34 of the master control device 30. Thereafter, the dialing process is completed as above, and voice communication is performed through the IP phone system 10.

After describing the methods of how the analog telephone device 14b or 14a is to call an IP phone device of the internet device 12a in accordance with the voice communication system configured over the IP phone system of the present invention, the following sections will describe how the IP phone device of the internet device 12a is to call the analog telephone device 14b or 14a, and how the analog telephone device 14a is to call the analog telephone device 14d through the IP phone system 10 as shown in FIG. 8.

Figure 7:
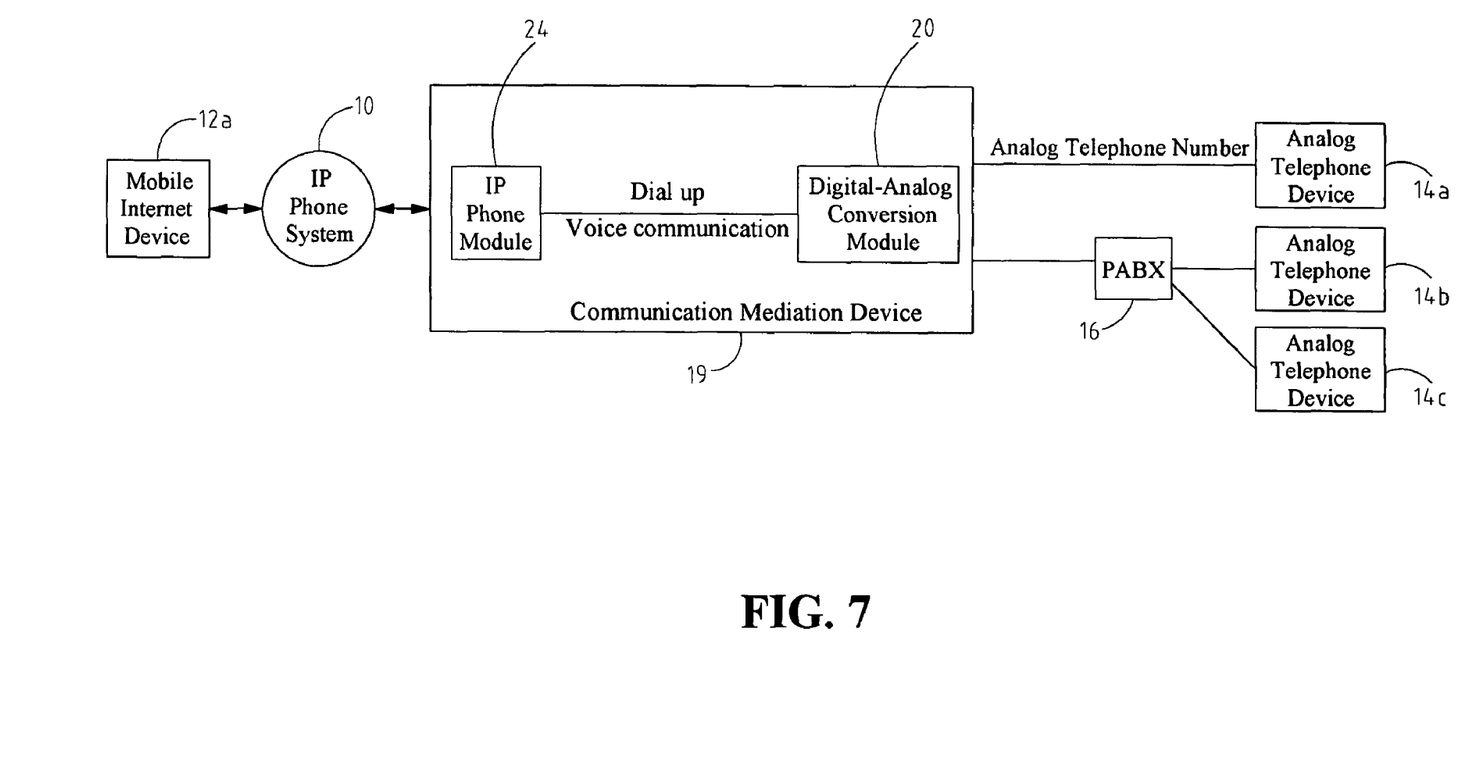
FIG. 7 is a schematic diagram showing the voice communication system configured over the IP phone system, in accordance with a third embodiment of the present invention.

With reference to FIG. 7, FIG. 7 is a schematic diagram showing a voice communication system configured over an IP phone system according to a third embodiment of the present invention. As shown in FIG. 7, if the IP phone device of the Internet device 12b is to call the analog telephone device 14b or 14a, the communication mediation device 19 is only required to include the IP phone module 24, and the analog-digital signal conversion module 20, because the conversion module 22 is no longer required for the simpler receiving of calls and voice communications requests.

When receiving calls from the IP phone device (i.e. the internet device 12b) in the IP phone system 10, the IP phone module 24 will transfer it to the analog-digital conversion module 20, wherein digital signal from the IP phone system 10 is converted to analog signal, especially after converting calls from the IP phone device of the IP phone system 10 to analog signal, and then transferring it to the analog telephone device 14b or 14a. After the analog telephone device 14b or 14a accepts the call, by means of the transfer using the IP phone device and the conversion using the analog-digital conversion module 20, the analog telephone device 14b or 14a may proceed with voice communications with the IP phone device.

With reference to FIG. 8, the FIG. 8 is a schematic diagram showing a voice communication system configured over the IP phone system according to a fourth embodiment of the present invention. As shown in FIG. 8, in the case that the analog telephone device 14a and 14d which respectively belongs to different companies is required to perform voice communications through the existing IP phone system 10 as mentioned above, the voice communication system comprise of the originating communication mediation device 18 (as shown in FIG. 2 and the related description) and the terminating communication mediation device 19 (as shown in FIG. 7 and related description).

For further elaboration, the analog-digital conversion module 20 in the originating communication mediation device 18 is to convert the telephone number sent by a first analog telephone device 14a into a digital signal, and converting the digital signal from the IP phone system 10 into an analog signal. After the analog-digital conversion module 20 has converted the telephone number in digital signal into the corresponding IP phone account D10d, the IP phone module 24 can, according to this IP phone account D10d, call a second analog telephone device 14d corresponding to the IP phone account through the IP phone system 10, so that the first analog telephone device 14a and the second analog telephone device 14d may perform voice communications.

In regards to the terminating communication mediation device 19, the IP phone module 24 can receive calls from the first analog telephone device 14a of the IP phone system 10 and/or proceed with voice communications with the second analog telephone device 14d. Then the analog-digital conversion module 20 will convert calls from the first analog telephone device 14a of the IP phone system 10 and/or voice communications into analog signal, and subsequently transferring the converted signal to the second analog telephone device 14d, so that the first analog telephone device 14a and the second analog telephone device 14d can perform voice communications.

Foregoing detailed description of the preferred embodiment is used for further understand the feature and sprit of the present invention, not to limit the scope of the present invention. It should be appreciated that there are many modifications and substitutions without departing from the spirit and the scope of the present invention which is defined by the appended claims.

What is claimed is:

1. A voice communication system configured over an IP phone system, for enabling an analog telephone device and an IP phone device to perform voice communications through the IP phone system, and in the IP phone system, the IP phone device is able to receive a call corresponding to its IP phone account and to perform voice communications, the voice communication system, comprising:

a communication mediation device, electrically coupled to the analog telephone device via a Private Automatic Branch Exchange (PABX), comprising:
an analog-digital signal conversion module, for converting a telephone number dialed by the analog telephone device into a digital signal, and converting the digital signal from the IP phone system into an analog signal;

a conversion module, for converting the telephone number in the digital signal into the corresponding IP phone account; and an IP phone module, for calling the IP phone device of the corresponding IP phone account through the IP phone system according to the IP phone account that is converted by the conversion module, thereby allowing the analog telephone device to proceed with voice communications with the IP phone device, wherein the analog telephone device is an extension telephone connected to the PABX and has an extension number, and configuring a plurality of communication lines between the PABX and the analog-digital signal conversion module of the communication mediation device, and the PABX having a main switchboard number, wherein the main switchboard number having the corresponding IP phone account, and the voice communication system, further comprising:

a master control device, comprising:

a status database, for storing a plurality of status data, wherein each status data is corresponding to each usage status of the main switchboard number corresponding to the communication lines, and the usage status is used for selection from busy and idle;

an update module, for updating the usage status of the main switchboard number corresponding to the communication lines according to a notification message from the communication mediation device;

an overflow database, for storing a plurality of overflow records, wherein each overflow record is using the main switchboard number to correspond with an overflow notification message;

an overflow module, for querying for the usage status of the communication lines corresponding to the main switchboard number based on the status data in the status database, and if their status are all busy, then updating the overflow notification message corresponding to the main switchboard number in the overflow database; and a continuous overflow module, for querying the overflow database for the overflow notification message corresponding to the main switchboard number based on the overflow records in the overflow database, if the overflow notification messages are found at a predetermined frequency, then sending out a continuous overflow message.

2. The voice communication system as claimed in claim 1, wherein the voice communication system, further comprising:

the master control device, comprising:

a corresponding database, for storing a plurality of corresponding data, wherein each corresponding data is corresponding to the IP phone account using the telephone number; and a supply module, for finding out the corresponding IP phone account from the corresponding database according to the telephone number from the conversion module, and replying the IP phone account to the conversion module.

3. The voice communication system as claimed in claim 2, wherein after the conversion module, according to the telephone number, obtained the corresponding IP phone account from the supply module, the communication module is able to store the corresponding relationship between the telephone number and the IP phone account into a storage media of the communication mediation device, thereby the conversion module is able to directly convert the telephone number into the corresponding IP phone account.

4. The voice communication system as claimed in claim 2, wherein the IP phone module further comprising: a conversion tool, capable of using the telephone number to obtain the corresponding IP phone account from the supply module of the master control device according to the corresponding data stored in the corresponding database of the master control device.

5. The voice communication system as claimed in claim 1, wherein the notification message sent by the communication mediation device is to be a dialing up or a hanging up message of the analog telephone device from the analog / digital signal conversion module or the IP phone module, or the notification message indicating when the conversion module is querying the corresponding IP phone account, according to the telephone number.

6. The voice communication system as claimed in claim 1, wherein when the usage status of the communication lines are all busy, the master control device is to reply to the communication mediation device that the calling line of the analog telephone device is busy.

7. The voice communication system as claimed in claim 1, wherein when one of the usage status of the communication lines is idle, the master control device is to reply to the communication mediation device that the calling line of the analog telephone device is idle and to reply to the corresponding IP phone account, thereby allowing the communication mediation device to connect the call of the analog telephone device.

8. The voice communication system as claimed in claim 1, wherein the voice communication system further comprising: the master control device, further comprising: a verification module, for finding out the communication lines which has expired predetermined time but is still in busy status based upon the usage status of the communication lines in the status database, and verifying whether these lines are in proper operation.

9. The voice communication system as claimed in claim 1, wherein the voice communication system further comprising:

the communication mediation device, further comprising:

a registration module, for collecting the registration information, wherein the registration information at least includes one of the telephone number and the main switchboard number, and the corresponding IP phone account; and the master control device, including:

an update module, for receiving the registration information from the registration module, and then updating the corresponding data in the corresponding database.

10. The voice communication system as claimed in claim 9, wherein the master control device is able to receive the IP phone account and the telephone number of the registration information by receiving the text message with the IP phone account and regarding the caller ID in the text message as the telephone number.

11. The voice communication system as claimed in claim 9, wherein the registration module is able to collect the telephone number, the corresponding IP phone account, and the company name in the registration information that was filled by the user, and sending out using the registration interface.

12. The voice communication system as claimed in claim 1, wherein the IP phone module is a client program of the IP phone system and is login to the IP phone system.

* * * * *